United States Patent [19]

Masuoka

[11] 3,825,945

[45] July 23, 1974

[54] FIELD EFFECT SEMICONDUCTOR MEMORY APPARATUS WITH A FLOATING GATE

[75] Inventor: Fujio Masuoka, Ebina, Japan

[73] Assignee: Tokyo Shibaura Electric Co., Ltd., Kawasaki-shi, Japan

[22] Filed: Feb. 27, 1973

[21] Appl. No.: 336,366

[30] Foreign Application Priority Data

Feb. 29, 1972 Japan ............................... 47-20973

[52] U.S. Cl. ........................ 357/23, 357/41, 357/54

[51] Int. Cl. ............................................ H01l 11/14

[58] Field of Search ........... 317/235 B, 46.5, 235 G, 317/235 AZ

[56] References Cited

UNITED STATES PATENTS

| | | | |
|---|---|---|---|
| 3,660,819 | 4/1972 | Bentchkowsky | 317/235 R |
| 3,728,695 | 3/1973 | Bentchkowsky | 340/173 R |
| 3,755,721 | 8/1973 | Bentchkowsky | 317/235 |
| 3,774,036 | 7/1973 | Bentchkowsky | 340/173 |
| 3,774,087 | 11/1973 | Bentchkowsky | 317/235 |

OTHER PUBLICATIONS

Electronics, "MOS Memories can be Reprogrammed Electrically," Electronics International Section, 9/27/71.

BSTJ Briefs, "A Floating Gate and Its Application to Memory Devices," by Kahng et al., pages 1288–1295, August 1967.

*Primary Examiner*—Martin H. Edlow
*Attorney, Agent, or Firm*—Flynn & Frishauf

[57] ABSTRACT

A field effect semiconductor memory apparatus with a floating gate which is so constructed that when a gate electrode is impressed with voltage, there is created across the floating gate and substrate an electric field stronger than, or at least as strong as, that prevailing across the floating gate and gate electrode, whereby the floating gate is stored with information by being impressed with a relatively low level of voltage and the stored information is extinguished by giving rise to an avalanche breakdown across the substrate and at least either of the source and drain.

7 Claims, 5 Drawing Figures

FIELD EFFECT SEMICONDUCTOR MEMORY APPARATUS WITH A FLOATING GATE

BACKGROUND OF THE INVENTION

This invention relates to a field effect semiconductor memory apparatus with a floating gate.

The process of providing a floating gate in the insulation layer of a field effect semiconductor transistor, storing information in the floating gate by electrically charging it and reading out the information thus stored has already been publicly set forth in the Bell System Technical Journal, 1967. However, this process presented difficulties in reducing as much as possible the thickness of an insulation layer formed between the floating gate and semiconductor substrate in order to impress voltage on the floating gate, using the tunnel effect. An attempt was made to improve the above-mentioned process by a patent application filed in the United States on June 15, 1970 (Ser. No. 46,148) and another patent application filed in that country on Jan. 15, 1971 (Ser. No. 106,642) (the Japanese patent application disclosure No. 806/1972). The process set forth in these patent applications resided in giving rise to an avalanche breakdown across the substrate and either of the drain and source of a semiconductor memory apparatus so as to electrically charge the floating gate, thereby storing information in said floating gate. However, the process proposed for improvement was accompanied with the drawback that extinction of the electric charge of the floating gate had to be carried out by long application of ultraviolet rays or X-rays to the floating gate through the insulation layer. For elimination of such difficulties, a further patent application was field in the United States on Jan. 15, 1971 (Ser. No. 106,643) (the Japanese patent application disclosure No. 15083/1972). The process of the last mentioned patent application consisted in providing a larger electrostatic capacity across the floating gate and substrate than across the floating gate and gate electrode in order to electrically extinguish the charge stored in the floating gate.

According to this process, however, the floating gate was stored with information by giving rise to the avalanche breakdown across the substrate and the source or drain of the semiconductor transistor for the electric charge of said floating gate. Therefore, it was necessary to create a sufficiently strong electric field in an insulation layer formed between the floating gate and substrate for electric energy to be attracted to the floating gate. Since this object had to be attained by impressing voltage on the gate electrode, the resultant electric energy should be effectively applied across the floating gate and substrate. According to the process of the immediately preceding patent application filed in the United States (Ser. No. 106,643), a smaller charge capacity was provided across the floating gate and gate electrode than across the floating gate and substrate. Even when, therefore, the gate electrode was impressed with voltage effectively to conduct the resultant energy to the floating gate, an electric field thus created was little effective. Further, the process of said immediately preceding patent application (Ser. No. 106,643) extinguished stored energy by creating an electronic avalanche across the gate electrode and substrate. In fact, however, the voltage of the gate electrode cannot be extinguished otherwise than by a pulse. Moreover, said pulse is demanded to have a characteristic of rising in an extremely short length of time as 0.1 to 0.01 micro second. An electronic avalanche actually continues for an interval of about 1 microsecond. Therefore, the above-mentioned process (Ser. No. 106,643) failed fully to extinguish stored information, unless such pulse was repeatedly applied over a long period. Further, said process delivers an electric charge from the floating gate to the gate electrode, as is customarily practised, by conducting an electric field or an avalanche current to an insulation layer formed between the outermost gate electrode and floating gate.

SUMMARY OF THE INVENTION

It is accordingly an object of this invention to provide a field effect semiconductor memory apparatus having a novel type of gating means and a method of extinguishing information stored in said apparatus.

Another object of the invention is to provide a process capable of storing and extinguishing information with a low voltage.

Another object of the invention is to provide gating means so formed as to attain the effective impression of voltage on the floating gate of said memory apparatus.

Still another object of the invention is to provide a process capable of effecting the electric extinction of stored information not only by pulses but also by D.C. voltage.

A further object of the invention is to provide a process capable of effecting said extinction by pulses which need not have high frequency characteristics.

A field effect semiconductor memory apparatus with a floating gate according to this invention is a type so designed that when the gate electrode is impressed with voltage, there is created across the floating gate and substrate an electric field stronger than, or at least as strong as, that generated across the floating gate and gate electrode.

The process according to this invention of extinguishing information stored in a semiconductor memory apparatus resides in giving rise to an avalanche breakdown across the substrate and at least either of the source and drain and, when the floating gate is supplied with electrons, effecting said extinction by neutralizing said electrons with holes introduced into the floating gate as the result of said avalanche breakdown. Supply of electrons to the floating gate is carried out by impressing the gate electrode with positive voltage relative to the substrate, and introduction of holes into the floating gate for extinction of stored information is effected by impressing the gate electrode with negative voltage relative to the substrate.

DESCRIPTION OF THE PREFERRED EMBODIMENTS

Figure 1:
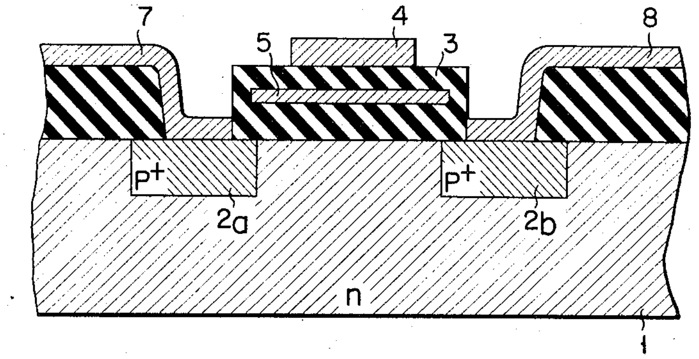
FIG. 1 is a sectional view of a semiconductor memory apparatus illustrating the principle of this invention.

There will now be described by reference to FIG. 1 the principle on which this invention is based. In the upper portion of a semiconductor substrate 1 are spatially formed two regions 2*a* and 2*b* each having a conductivity opposite to that of the substrate 1. On the upper surface of the substrate 1 is provided an insulation layer 3 so as to bridge both regions 2*a* and 2*b*. Further on said insulation layer 3 is mounted an outermost gate electrode 4, and within said insulation layer 3 is formed a floating gate 5. Thus is constructed the subject field effect semiconductor memory apparatus. Reference numerals 7 and 8 denote two conductor strips connected to the aforesaid regions 2*a* and 2*b*.

Referring to the semiconductor memory apparatus of FIG. 1, let the distance between the outermost gate electrode 4 and floating gate 5 be represented by dl; the electrostatic capacity of that part of the insulation layer 3 defined within said distance d1 by c1; the distance between the floating gate 5 and the upper surface of the semiconductor substrate 1 by *d*2; and the electrostatic capacity of that part of the insulation layer 3 defined within said distance *d*2 by *c*2. Further, when the outermost gate electrode 4 is impressed with voltage V, let the electric field created across said electrode 4 and floating gate 5 indicated by E1 and the electric field generated across said floating gate 5 and substrate 1 by E2. Then these electric fields E1 and E2 may be expressed by the following equations:

$$E1 = c2/(c1 + c2)d1 \times V \quad (1)$$

$$E2 = c1/(c1 + c2)d2 \times V \quad (2)$$

The condition in which E2 should be made stronger than, or at least as strong as, E1 may be determined from the following equation derived from the above equations (1) and (2)

$$c1 \cdot d1 \quad c2 \cdot d2 \quad (3)$$

Now let the dielectric constant of the region of the insulation layer 3 defined between the outermost gate electrode 4 and floating gate 5 be designated by $\epsilon 1$, the area of that surface of the floating gate 5 which faces the outermost gate 4 by S1, the dielectric constant of that region of the insulation layer 3 defined between the floating gate 5 and the upper surface of the substrate 1 by $\epsilon 2$ and the area of that surface of the floating gate 5 which faces the substrate 1 by S2. Then there result the following equations:

$$c1 = \epsilon 1 \cdot S1/dl \qquad c2 = \epsilon 2 \cdot S2/d2$$

Therefore, there can be derived from the aforementioned equation (3) the following equation:

$$\epsilon 1 \cdot S1 \gtreqqless \epsilon 2 \cdot S2 \quad (4)$$

Namely, the semiconductor memory apparatus of this invention has its gate so constructed as to satisfy the above equation (4).

Figure 2:
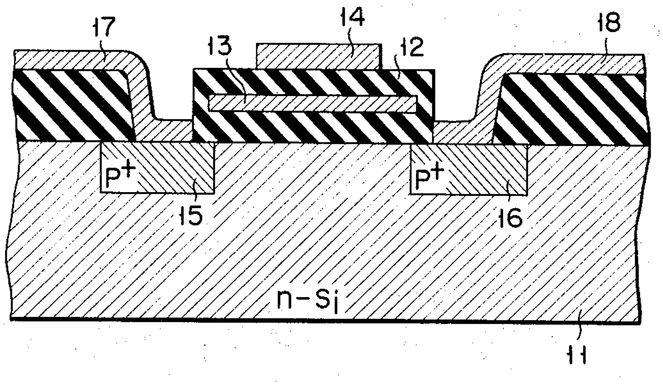
FIG. 2 is a sectional view of an embodiment of the invention.

There will now be described the construction of a semiconductor memory apparatus according to an embodiment of this invention. Referring to FIG. 2, there are spatially formed in the upper portion of an N type silicon substrate 11 two $P^+$ type regions 15 and 16 each having a conductivity opposite to that of said substrate 11, said regions 15 and 16 being generally referred to as source and drain regions respectively. On the upper surface of the substrate 11 is provided an insulation layer 12 made of, for example, silicon oxide ($SiO_2$) so as to bridge the source and drain regions 15 and 16. On the silicon oxide insulation layer 12 is mounted an outermost gate electrode 14, which may be formed of either a polycrystalline silicon layer or a layer of metals, for example, aluminum, provided that the layer is electrically conductive. In said insulation layer 12 is formed a floating gate 13, which may be formed of either a polycrystalline silicon layer or a layer of metals, provided that the layer is electrically conductive. Reference numerals 17 and 18 denote two conductor strips connected to the source 15 and drain 16 respectively.

Figure 3:
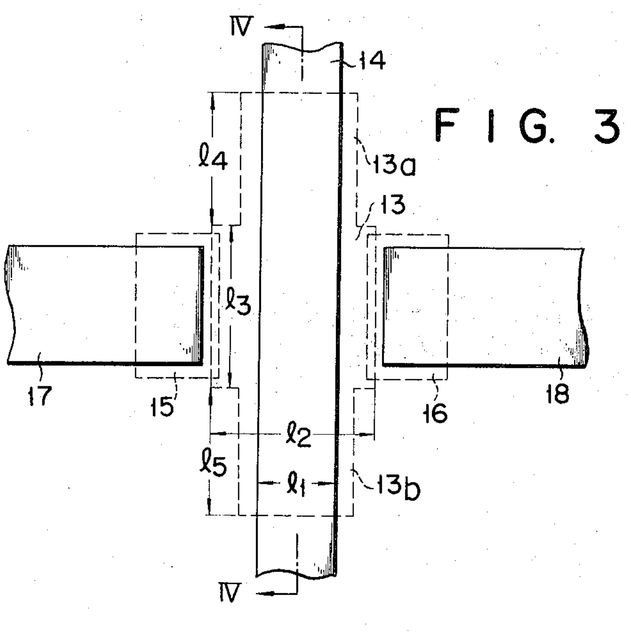
FIG. 3 is a top view of FIG. 2.

FIG. 3 is a top view of FIG. 2. The embodiment of FIG. 1 is characterized by such construction of the floating gate 13 as is illustrated in the sectional view of FIG. 4 on line IV—IV of FIG. 3. Namely, the floating gate 13 is provided at both ends with outwardly directed projections 13*a* and 13*b*. These projections 13*a* and 13*b* are disposed in those parts of the insulation layer 12 which constitute both sides of a region where there is to be formed a channel, namely, both sides of that portion of the insulation layer 12 defined between the source and drain regions 15 and 16, so as to be prevented from exerting any effect on the memory operation of the subject apparatus. In other words, said projections 13a and 13*b* may be deemed as such mutually facing electrodes as do not vary the electrostatic capacity *c*2 relative to the semiconductor substrate 11, but only the electrostatic capacity *c*2 relative to the elongate outermost gate electrode 14. Provision of said outwardly directed projections 13*a* and 13*b* enables the area S1 of that surface of the floating gate 13 which faces the outermost gate 14 to be made larger than the area S2 of that surface of the floating gate 13 which faces the substrate 11, namely, can satisfy the aforesaid equation (4).

Figure 4:
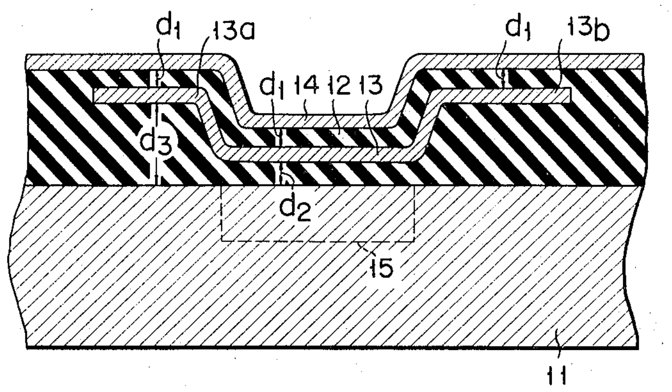
FIG. 4 is a sectional view on line IV—IV of FIG. 3.

Now let the dimensions of the floating gate 13 of FIG. 3 be indicated as $l_1 = 14\ \mu$ $\left.\begin{matrix} l_2 \\ l_3 \\ l_4 \\ l_5 \end{matrix}\right\} = 20\ \mu$ And let the thicknesses d1 and d2 of the insulation layer 12 of FIG. 4 be indicated as $d1 = d2$ $d3 >> d2$ Then the effective areas S1 and S2 of the equation (4) may be expressed as follows:

$S1 \approx 8 \times 10^{-6}$ cm $S2 \approx 4 \times 10^{-6}$ cm

Assuming $dl = d2 = 2000$ A and also that the outermost electrode 14 is impressed with a voltage of +30 V, then the electric field E1 created across said outermost electrode 14 and floating gate 13 and the electric field E2 generated across said floating gate and substrate 11 may be given as follows from the equations (1) and (2) respectively:

$E1 \approx 0.5 \times 10^6$ V/cm $E2 \approx 1 \times 10^6$ V/cm

Since, as described above, the voltage impressed on the outermost gate electrode 14 is effectively supplied across the floating gate 13 and substrate 11, a carrier generated by an avalanche breakdown taking place across the semiconductor substrate and either of the source and drain can be efficiently introduced into said floating gate 13. Further, availability of a low avalanche breakdown voltage enables the drain 16 to be supplied with a low voltage in storing and extinguishing information. This means that it is possible to use a lower power supply voltage than required for the prior art semiconductor memory apparatus and in consequence the transistor included in the surrounding circuit, for example, decoder circuit of the semiconductor memory apparatus of this invention is allowed to have a low withstand voltage, thereby facilitating the integration of the present memory apparatus and a circuitry associated therewith. The electric field created across the outermost gate electrode 14 and floating gate 13 is not, as in the conventional semiconductor memory apparatus, stronger than that generated across the floating gate 13 and substrate 11. Therefore, the semiconductor memory apparatus of this invention has a prominent property of firmly holding stored information, displaying a true merit as a nonvolatile memory type.

The foregoing embodiment refers to the case where the effective area S1 of that surface of the floating gate 13 which faced the outermost gate electrode 14 was made larger than the effective area S2 of that surface of said floating gate 13 which faced the semiconductor substrate 11. However, this invention is not limited to this process, but may be applicable to any other cases, provided that the previously mentioned equation (4) is satisfied. For example, even where the effective area S1 is made equal to, or less than the effective area S2, the same result will be obtained if that portion of the insulation layer 12 which is defined between the outermost gate and floating gate is formed of a different material from the material of that portion of the insulation layer 12 which is defined between the floating gate and substrate so as to satisfy the condition of $\epsilon 1 > \epsilon 2$. In this case, materials attaining $\epsilon 1$ and $\epsilon 2$ may be used in various combinations as $Si_3N_4$ for $\epsilon 1$ as against $SiO_2$ for $\epsilon 2$ or $Al_2O_3$ for $\epsilon 1$ as against $SiO_2$ for $\epsilon 2$.

Figure 5:
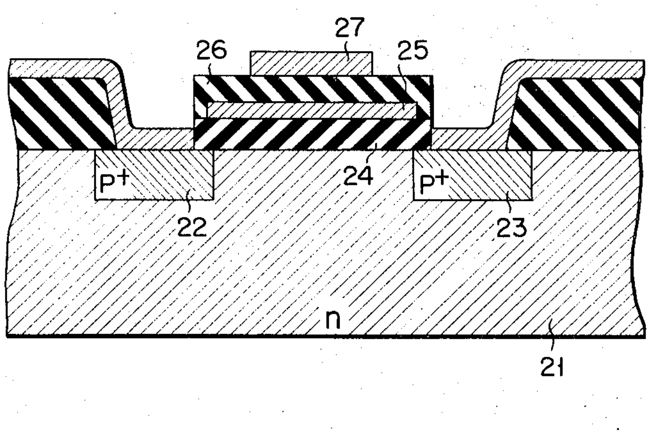
FIG. 5 is a sectional view of another embodiment of the invention.

FIG. 5 presents another embodiment of this invention. In the upper portion of a semiconductor substrate 21, for example, an N type silicon substrate are spatially formed two $P^+$ type regions 22 and 23 each having a conductivity type opposite to that of said substrate 21. These two regions are generally referred to as the source and drain respectively. On the upper surface of the substrate 21 is disposed an insulation layer, for example, a layer of silicon (oxide $SiO_2$) 24 with a thickness of 2000 A so as to bridge the source 22 and drain 23. Further on said silicon oxide layer 24 is provided a polycrystalline silicon layer 25 acting as a floating gate. On the polycrystalline silicon layer 25 is positioned a silicon (nitride $Si_3O_4$) layer 26 having a thickness of 2000 A bridging the layer of silicon oxide 24 and the polycrystalline silicon layer 25. On the silicon nitride layer 26 is mounted an outermost gate electrode 27. Thus is constructed a field effect semiconductor memory apparatus according to the second embodiment of FIG. 5. In this case, it is possible to replace said silicon nitride layer 26 with an alumina ($Al_2O_3$) layer having a thickness of 2000 A so as to satisfy the condition $\epsilon 1 > \epsilon 2$ with respect to the dielectric constant of a region defined between the silicon oxide layer 24 and the alumina layer 26.

A field effect semiconductor memory apparatus according to the second embodiment of FIG. 5 is also of such type that when the outermost gate electrode 27 is impressed with voltage, there is created across the floating gate 25 and substrate 21 a stronger electric field than across the floating gate 25 and outermost gate electrode 27.

There will now be described by reference to FIG. 2 the process by which the field effect semiconductor memory apparatus of this invention stores and electrically extinguishes information. The floating gate 13 is stored with information by introducing electrons thereinto in the following manner. The semiconductor substrate 11 is grounded. Either of the source 15 and drain 16, for example, the source 15 is impressed with a negative pulse voltage of 30 V relative to the substrate 11, and the outermost gate electrode 14 is supplied with a positive voltage of 20 V relative to said substrate 11. Then an avalanche breakdown takes place across the source 15 and substrate 11. Of the high energy electron-hole pairs created by said avalanche breakdown, the electrons are carried into the floating gate 13 by an electric field generated in the insulation layer 12 across the floating gate 13 and substrate 11 so as to store information. The present semiconductor memory apparatus electrically extinguishes stored information by introducing holes into the floating gate 13 to neutralize the energy charged therein. Namely, either of the source 15 and drain 16, for example, the drain 16 is impressed with a negative pulse voltage of 50 V relative to the substrate 11. The outermost gate electrode 14 is supplied with a negative voltage of 80 V relative to said substrate 11. At the result, an avalanche breakdown occurs across the drain 16 and substrate 11. Of the high energy electron-hole pairs generated at this time, the holes are introduced into the floating gate 13 by an electric field created in the insulation layer 12 across the floating gate 13 and substrate 11, thereby extinguishing the information stored in the floating gate 13 by neutralization between the previously charged electrons and the holes now introduced.

Extinction of information can be effectively carried out by constructing the insulation layer 12 so as to permit the efficient introduction of extinction energy therethrough into the floating gate 13. This object is attained by forming the insulation layer 12 such that when the outermost gate electrode 14 is impressed with voltage, there is created across the floating gate 13 and substrate 11 an electric field stronger than, or at least as strong as, that generated across the floating gate 13 and outermost gate electrode 14.

As previously described, the semiconductor memory apparatus of this invention in which there are formed source and drain regions on one side of the semiconductor substrate and an insulation layer bridging the source and drain regions contains a floating gate is characterized in that the insulation layer is so formed as to permit the efficient introduction of electric energy into the floating gate, and that information stored in the floating gate is electrically extinguished by giving rise to an avalanche breakdown across the substrate and either of the source and drain regions, thereby neutralizing the energy previously charged in the floating gate with the opposite type of energy derived from said avalanche breakdown.

As previously mentioned, creation across the floating gate and substrate of an electric field stronger than, or at least as strong as, that generated across the floating gate and outermost gate electrode enables a lower voltage than required for the conventional semiconductor memory apparatus to be used in storing and extinguishing information.

The aforesaid avalanche breakdown used in storing and extinguishing information can be continued by either pulse voltage or D.C. voltage for any desired length of time.

What is claimed is:

1. A field effect semiconductor memory apparatus comprising:

a semiconductor substrate of a first conductivity type;

a plurality of regions spatially formed in the semiconductor substrate and being of a second conductivity type opposite to that of the semiconductor substrate to form a channel therebetween;

an insulation layer formed on the upper surface of the semiconductor substrate so as to bridge said plurality of regions, said insulation layer having a recess opposing said channel;

a control gate electrode formed on a portion of the upper surface of the insulation layer including the surface of said recess; and a floating gate electrode disposed within said insulation layer substantially in parallel with said control gate electrode with the control gate electrode overlapping the floating gate electrode, such that the capacitance defined between the control electrode and the floating gate electrode is larger than that defined between the floating gate electrode and the channel.

2. A field effect semiconductor memory apparatus according to claim 1 wherein the dielectric constant of the insulation material disposed between said control electrode and floating gate electrode is larger than that of the insulation material disposed between said floating gate electrode and the channel.

3. A field effect semiconductor memory apparatus according to claim 1 wherein said control gate electrode and floating gate electrode have substantially the same general profile.

4. A field effect semiconductor memory apparatus according to claim 1 wherein said control gate electrode and floating gate electrode each have projections extending beyond said recess, said projections being substantially in parallel with each other and with the upper surface of said substrate.

5. A field effect semiconductor memory apparatus according to claim 1 wherein, in the area opposing said channel, the distance between the upper surface of said substrate and the lower surface of said floating gate electrode is substantially equal to the distance between the upper surface of said floating gate electrode and the lower surface of said control gate electrode.

6. A field effect semiconductor memory apparatus according to claim 5 wherein said control gate electrode and floating gate electrode each have projections extending beyond said recess, said projections being substantially in parallel with each other and with the upper surface of said substrate; the distance between the lower surface of the projections of said floating gate electrode and the upper surface of said substrate being greater than the distance between the upper surface of the projections of said floating gate electrode and the lower surface of the projections of said control gate electrode.

7. A field effect semiconductor memory apparatus comprising:

a semiconductor substrate of a first conductivity type;

first and second regions spatially formed in the semiconductor substrate and being of a second conductivity type opposite to that of the semiconductor substrate to form a channel therebetween;

a first insulation layer of a first dielectric material formed on the upper surface of the semiconductor material so as to bridge said first and second regions;

a floating gate electrode provided on said first insulation layer;

a second insulation layer positioned on the floating gate electrode bridging the floating gate electrode and the first insulation layer and having substantially the same thickness as that of the first layer, the dielectric constant of the second insulation layer being larger than that of the first insulation layer; and a control gate electrode mounted on the second insulation layer, such that the capacitance defined between the control electrode and the floating gate electrode is larger than that defined between the floating gate electrode and the channel.

* * * * *